US011711788B2

(12) United States Patent
Sakhnini et al.

(10) Patent No.: US 11,711,788 B2
(45) Date of Patent: Jul. 25, 2023

(54) TECHNIQUES FOR PROVIDING WAVEFORM SWITCHING GAPS IN WIRELESS COMMUNICATIONS

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 17/203,375

(22) Filed: Mar. 16, 2021

(65) Prior Publication Data

US 2022/0303981 A1 Sep. 22, 2022

(51) Int. Cl.
*H04W 72/04* (2023.01)
*H04W 72/0446* (2023.01)
*H04W 72/23* (2023.01)
*H04W 72/51* (2023.01)

(52) U.S. Cl.
CPC ....... *H04W 72/0446* (2013.01); *H04W 72/23* (2023.01); *H04W 72/51* (2023.01)

(58) Field of Classification Search
CPC ........... H04W 72/0446; H04W 72/042; H04W 72/048; H04W 74/0833; H04L 27/2649; H04L 27/2601; H04L 1/0045; H04L 1/0061; H04L 1/0058; H04L 1/0071; H04L 5/0007
See application file for complete search history.

(56) References Cited

U.S. PATENT DOCUMENTS

| | | | |
|---|---|---|---|
| 9,572,063 B2 | 2/2017 | Etemad et al. | |
| 2003/0095498 A1 | 5/2003 | Sato et al. | |
| 2008/0198793 A1* | 8/2008 | Lysejko | H04B 7/0851 370/328 |
| 2014/0073356 A1* | 3/2014 | Siomina | H04W 4/029 455/456.2 |
| 2017/0093506 A1 | 3/2017 | Miao et al. | |
| 2018/0035423 A1 | 2/2018 | Wang et al. | |
| 2018/0092086 A1 | 3/2018 | Nammi et al. | |
| 2022/0210784 A1 | 6/2022 | Sakhnini et al. | |
| 2022/0312440 A1* | 9/2022 | Bagheri | H04W 72/044 |

OTHER PUBLICATIONS

International Search Report and Written Opinion—PCT/US2022/070798—ISA/EPO—dated Jun. 7, 2022.
Samsung: "RAN2 Aspect on Different Waveforms for Uplink Transmission", 3GPP TSG-RAN WG2 Meeting #98, R2-1705827, 3rd Generation Partnership Project (3GPP), Mobile Competence Centre, 650, Route Des Lucioles, F-06921 Sophia-Antipolis Cedex, France, vol. RAN WG2, No. Hangzhou, China, May 15, 2017- May 19, 2017, May 14, 2017 XP051276102, 4 Pages.

* cited by examiner

*Primary Examiner* — Wei Zhao
(74) *Attorney, Agent, or Firm* — Arent Fox, LLP

(57) ABSTRACT

Aspects described herein relate to switching waveforms in a waveform switching gap. In an aspect, using a transceiver, a first signal of a first waveform can be communicated in a first time period. In a waveform switching gap, the transceiver can be switched to use a second waveform. Using the transceiver, a second signal of a second waveform can be communicated in a second time period. The waveform switching gap may occur between the first time period and the second time period.

30 Claims, 8 Drawing Sheets

TECHNIQUES FOR PROVIDING WAVEFORM SWITCHING GAPS IN WIRELESS COMMUNICATIONS

BACKGROUND

Aspects of the present disclosure relate generally to wireless communication systems, and more particularly, to switching between waveforms used in wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, such as 5G NR, devices, including user equipment (UE) or base stations (e.g., gNBs), can switch between different waveforms in communicating with one another.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, a memory configured to store instructions, and one or more processors communicatively coupled with the memory and the transceiver. The one or more processors are configured to communicate, using the transceiver, a first signal of a first waveform in a first time period, switch, in a waveform switching gap, the transceiver to use a second waveform, and communicate, using the transceiver, a second signal of a second waveform in a second time period, wherein the waveform switching gap occurs between the first time period and the second time period.

In another aspect, a method of wireless communication is provided. The method includes communicating, using a transceiver, a first signal of a first waveform in a first time period, switching, in a waveform switching gap, the transceiver to use a second waveform, and communicating, using the transceiver, a second signal of a second waveform in a second time period, wherein the waveform switching gap occurs between the first time period and the second time period.

According to another aspect, an apparatus for wireless communication is provided that includes means for communicating, using a transceiver, a first signal of a first waveform in a first time period, means for switching, in a waveform switching gap, the transceiver to use a second waveform, and means for communicating, using the transceiver, a second signal of a second waveform in a second time period, wherein the waveform switching gap occurs between the first time period and the second time period.

In another aspect, a computer-readable medium including code executable by one or more processors for wireless communication is provided. The code includes code for communicating, using a transceiver, a first signal of a first waveform in a first time period, switching, in a waveform switching gap, the transceiver to use a second waveform, and communicating, using the transceiver, a second signal of a second waveform in a second time period, wherein the waveform switching gap occurs between the first time period and the second time period.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
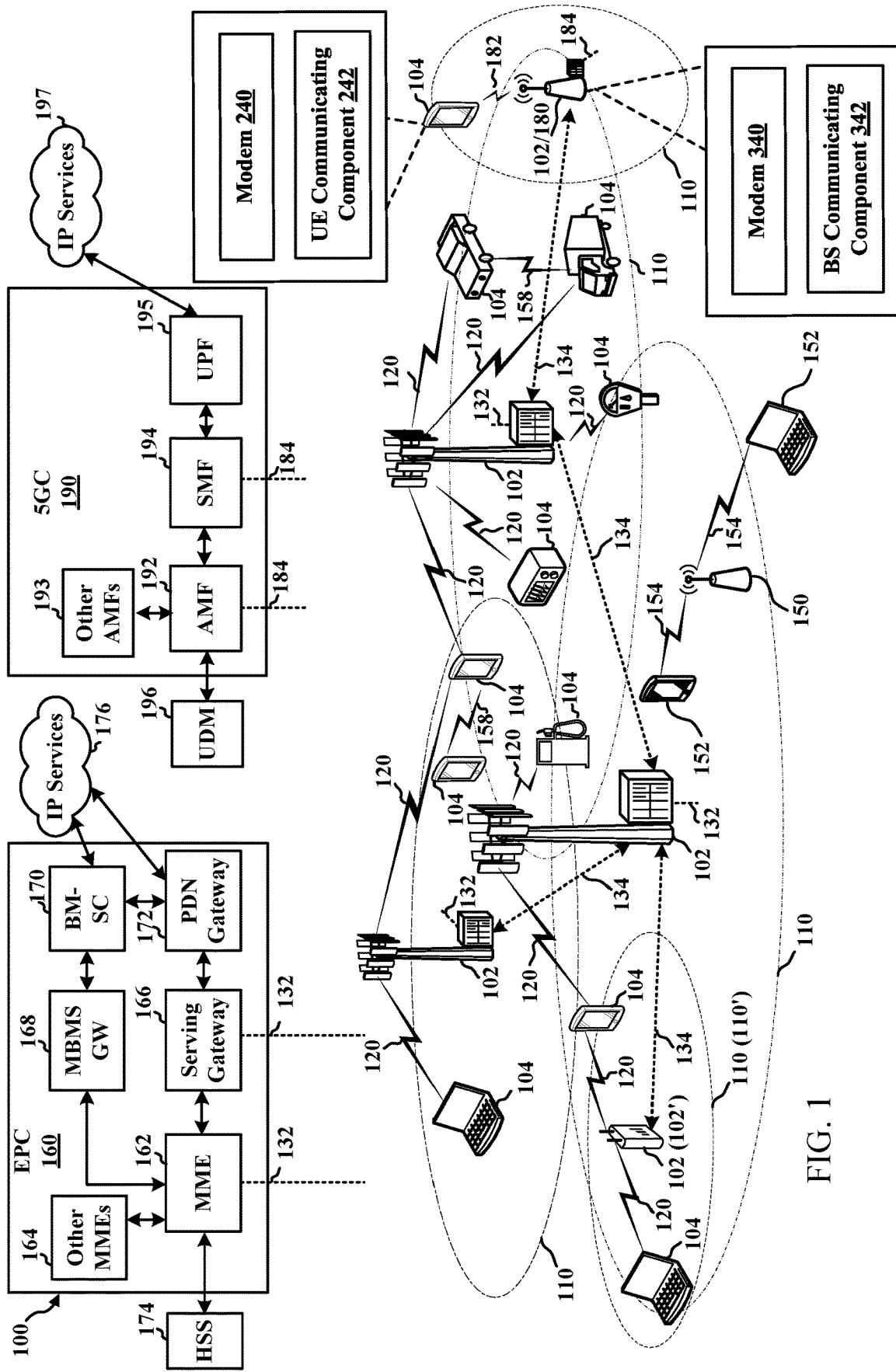
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to providing waveform switching gaps for allowing devices to switch waveforms in wireless communications. For example, in wireless communication technologies such as fifth generation (5G) new radio (NR), higher operating bands with larger bandwidths are being implemented. For a larger BW, several waveforms can be used (e.g., for the downlink (DL) operation, such as orthogonal frequency division multiplexing (OFDM), single carrier frequency domain implementation (e.g., discrete Fourier transform-spread-OFDM (DFT-s-OFDM)), single carrier time domain implementation (e.g., single carrier-quadrature amplitude modulation (SC-QAM)), etc. For example, single carrier frequency domain implementations can provide low peak-to-average power ratio (PAPR) (e.g., improved coverage), Single tap frequency domain equalization (FDE), efficient bandwidth (BW) utilization (e.g., no guard band needed). In another example, single carrier time domain implementation can provide low PAPR, low complexity implementation (e.g., no fast Fourier transform (FFT)/inverse FFT (IFFT) needed), etc. In another example, OFDM can provide higher PAPR, high signal-to-noise ratio (SNR), high spectral efficiency, high order multiple-input multiple-output (MIMO) to achieve extremely high data rate, single tap FDE, efficient BW utilization (e.g., no guard band needed), easy frequency division multiplexing (FDM) capability, etc.

As such, for example, at least for a higher band operation, the conditions may not always be ideal for a certain waveform and changing between waveforms may be desirable. For example, a device (e.g., a user equipment (UE) or base station—e.g., gNB—in 5G NR) can change between waveforms based on certain considerations, such as transmit power requirements, FDM requirements, MIMO requirements, etc. of associated communications. For example, cell edge UEs may have low SNR, may be power limited, may not need MIMO, etc., and SC may be an optimal or desirable waveform. In another example, UEs with good (e.g., at least a threshold) SNR can have multi-path rich channels and can use higher order MIMO (especially when they are not power limited); in such cases, OFDM may be the optimal or desirable waveform. UEs, however, may need, or may otherwise benefit from, having some allotted time to switch between these waveforms. As such, waveform switching gaps are described herein to allow the UE to switch between waveforms without impacting communications (e.g., such that the UE is not to receive anything while it is changing waveforms). Though generally described in terms of 5G NR, devices using substantially any wireless communication technology can implement waveform switching gaps using the concepts described herein.

In an aspect, a device can use or configure a waveform switching gap as an explicit gap, or period of time, between transmissions using the waveforms. In another aspect, a device can use or configure a waveform switching gap as a period of time that is absorbed in a cyclic prefix (CP) or guard interval (GP) between transmissions using the waveforms. In yet another aspect, a device can use or configure a waveform switching gap by creating the gap by adding tail symbols to pre-DFT samples of a first transmission, at least where DFT-s-OFDM is used as the waveform for the first transmission. In one or more of these aspects, the device can use the configured or created waveform switching gap to switch between waveforms in performing wireless communications with one or more other devices. This can include transmitting wireless communications to the one or more other devices or receiving communications from the one or more other devices. In addition, the devices can include UEs, base stations, etc., that communicate with one another using the various waveforms. In one example, one device can configure another device to use the waveform switching gap, one device can indicate a capability to the other device of using or creating the waveform switching gap, etc., as described further herein.

Accordingly, in various examples described herein, devices can define, determine, use, configure, etc. waveform switching gaps to switch among waveforms in wireless communications. Using waveform switching gaps, in this regard, can help to ensure that devices do not miss transmitting or receiving any communications while changing waveforms, which can improve communication throughput, and thus user experience, in using the devices.

The described features will be presented in more detail below with reference to FIGS. 1-8.

As used in this application, the terms "component," "module," "system" and the like are intended to include a computer-related entity, such as but not limited to hardware, firmware, a combination of hardware and software, software, or software in execution.

For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and UE communicating component 242 for using waveform switching gaps to switch waveforms in communicating with one or more other devices, in accordance with aspects described herein. In addition, some nodes may have a modem 340 and BS communicating component 342 for using or configuring waveform switching gaps to switch waveforms in communicating with one or more other devices, in accordance with aspects described herein. Though a UE 104 is shown as having the modem 240 and UE communicating component 242 and a base station 102/gNB 180 is shown as having the modem 340 and BS communicating component 342, this is one illustrative example, and substantially any node or type of node may include a modem 240 and UE communicating component 242 and/or a modem 340 and BS communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, UE communicating component 242 can communicate with one or more other devices in the wireless network, such as one or more base station 102, one or more other UEs 104, etc., using a first waveform. UE communicating component 242 can switch, in a waveform switching gap, to a second waveform for communicating with the one or more other devices. For example, UE communicating component 242 can switch a transceiver from transmitting or receiving communications using the first waveform to transmitting or receiving communications using the second waveform, where the switching can occur in a waveform switching gap. In an example, BS communicating component 342 can similarly switch a transceiver of a base station 102 communicating with the UE 104 so that the base station 102 and UE 104 can communicate using the same waveform. In another example, BS communicating component 342 can configure the UE 104 (or one or more other devices) with the waveform switching gap or otherwise to switch the waveform.

Figure 2:
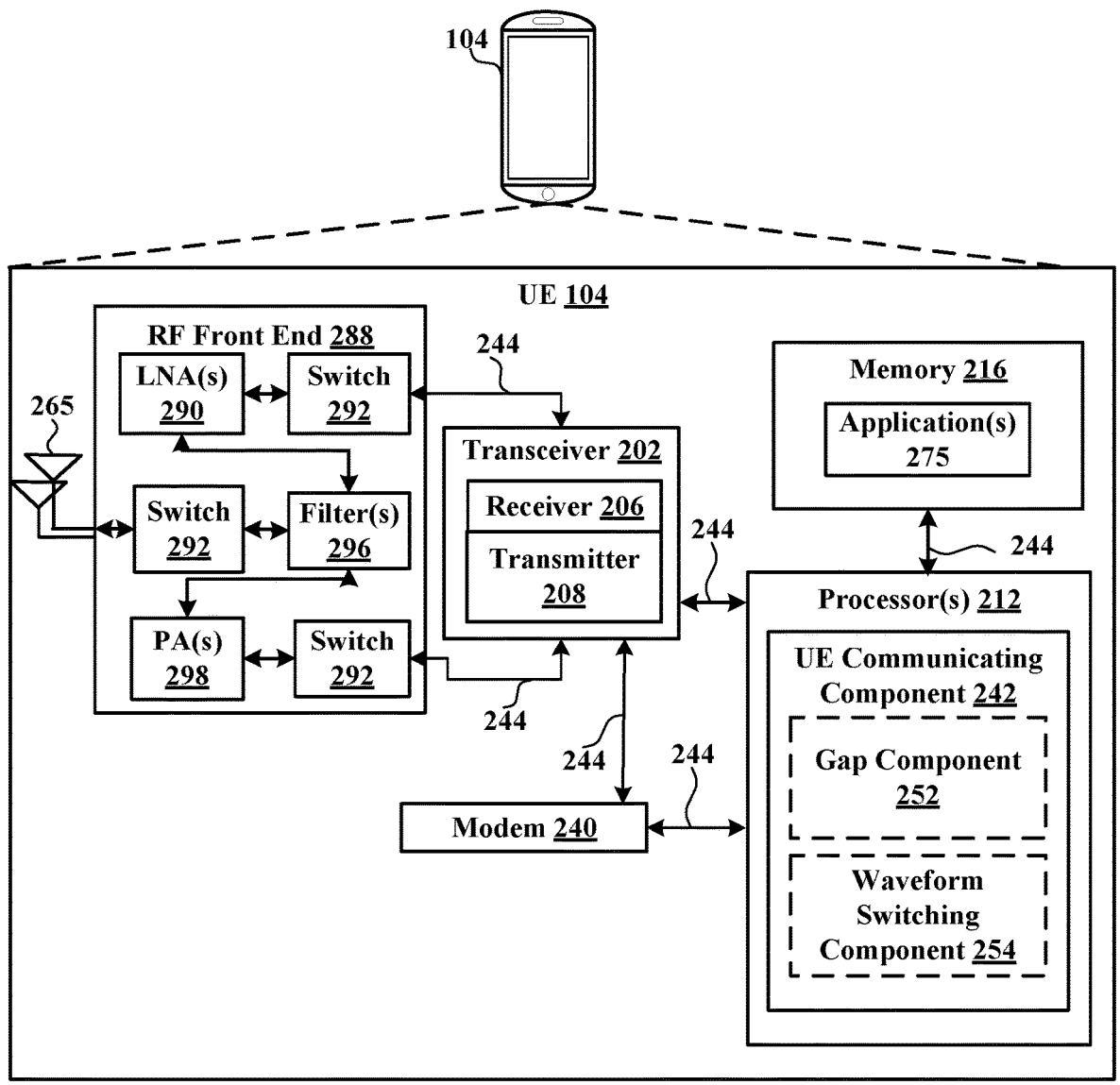
FIG. 2 is a block diagram illustrating an example of a UE, in accordance with various aspects of the present disclosure.
Figure 3:
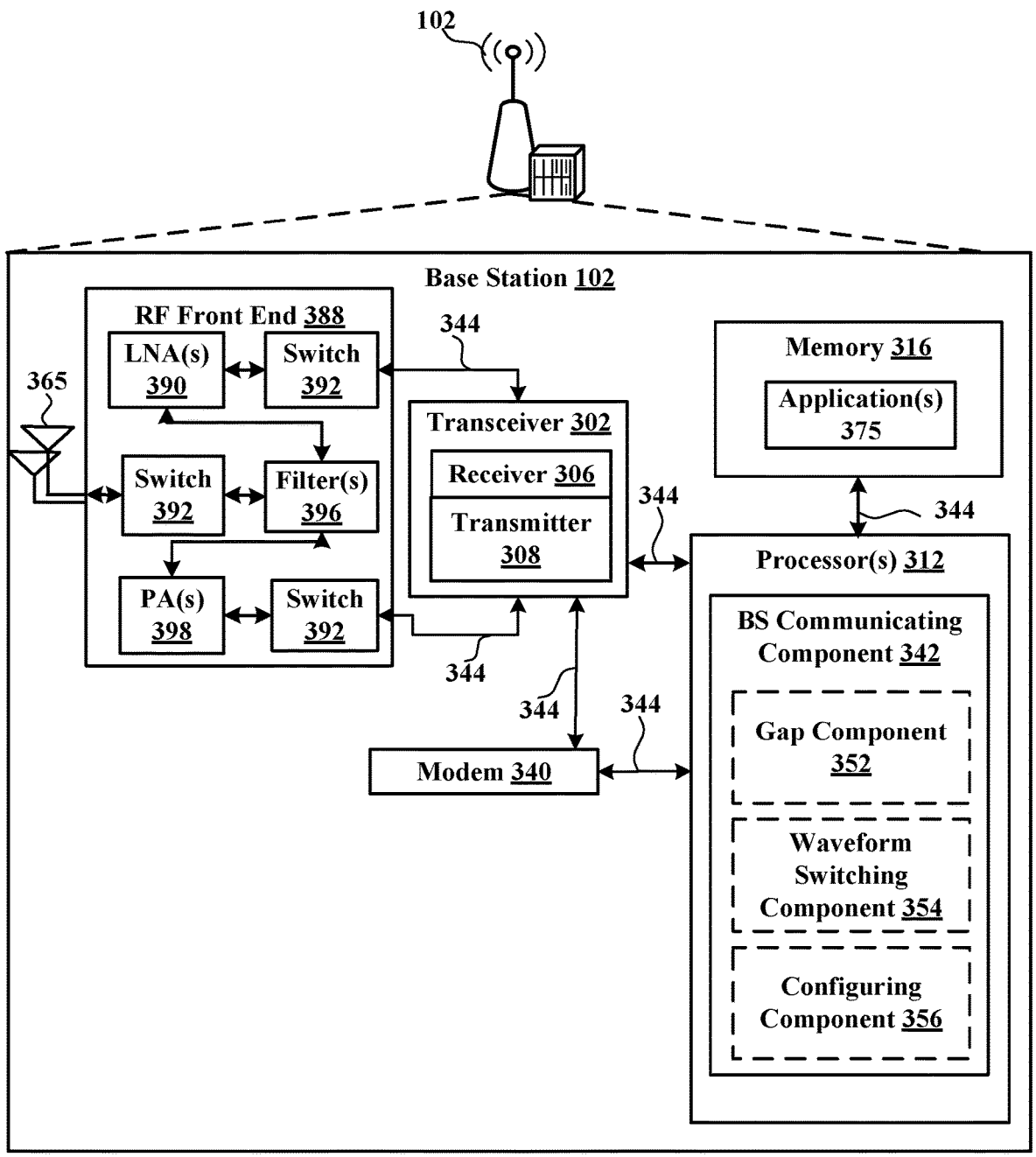
FIG. 3 is a block diagram illustrating an example of a base station, in accordance with various aspects of the present disclosure.
Figure 4:
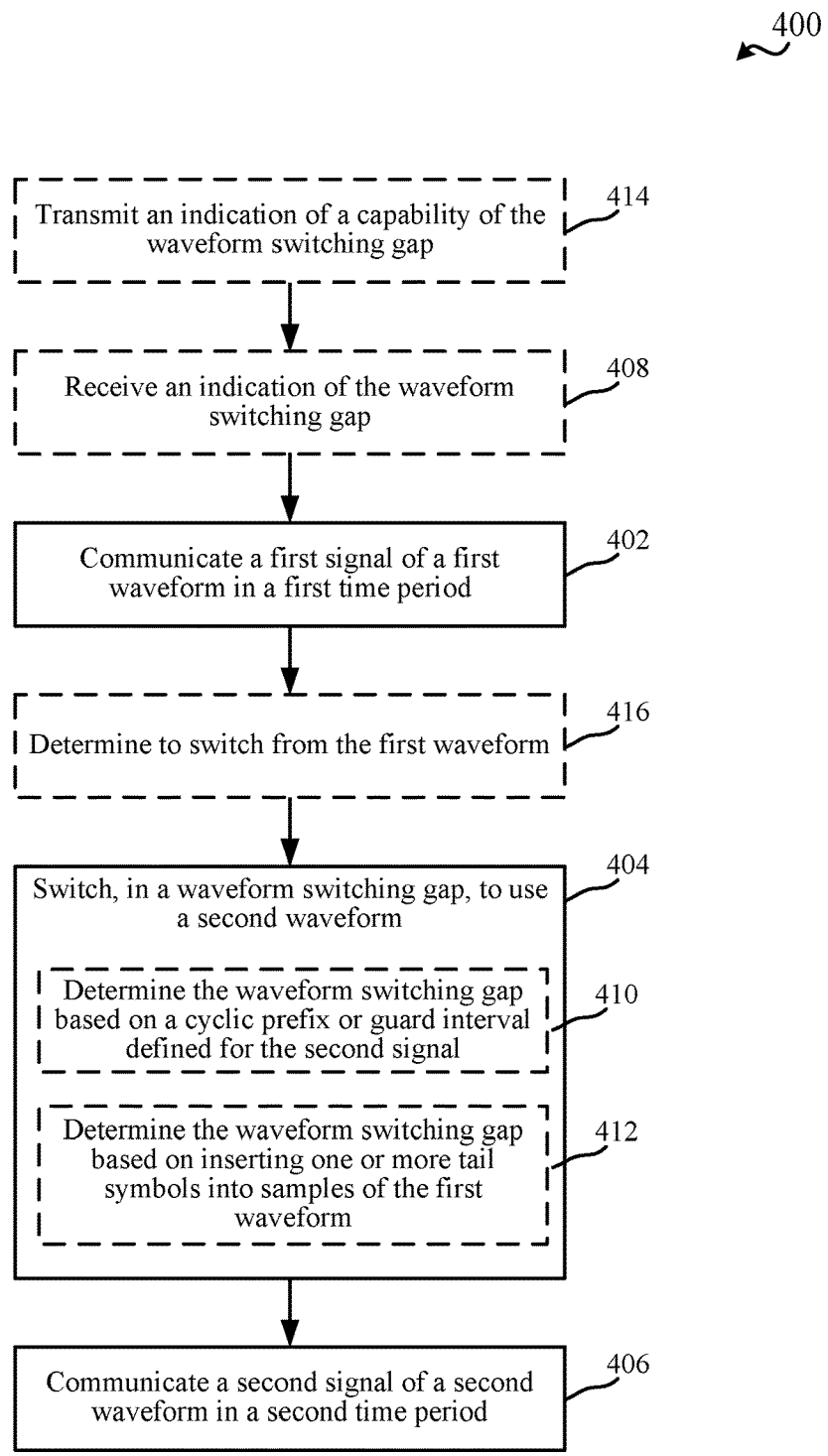
FIG. 4 is a flow chart illustrating an example of a method for switching waveforms, in accordance with aspects described herein.
Figure 5:
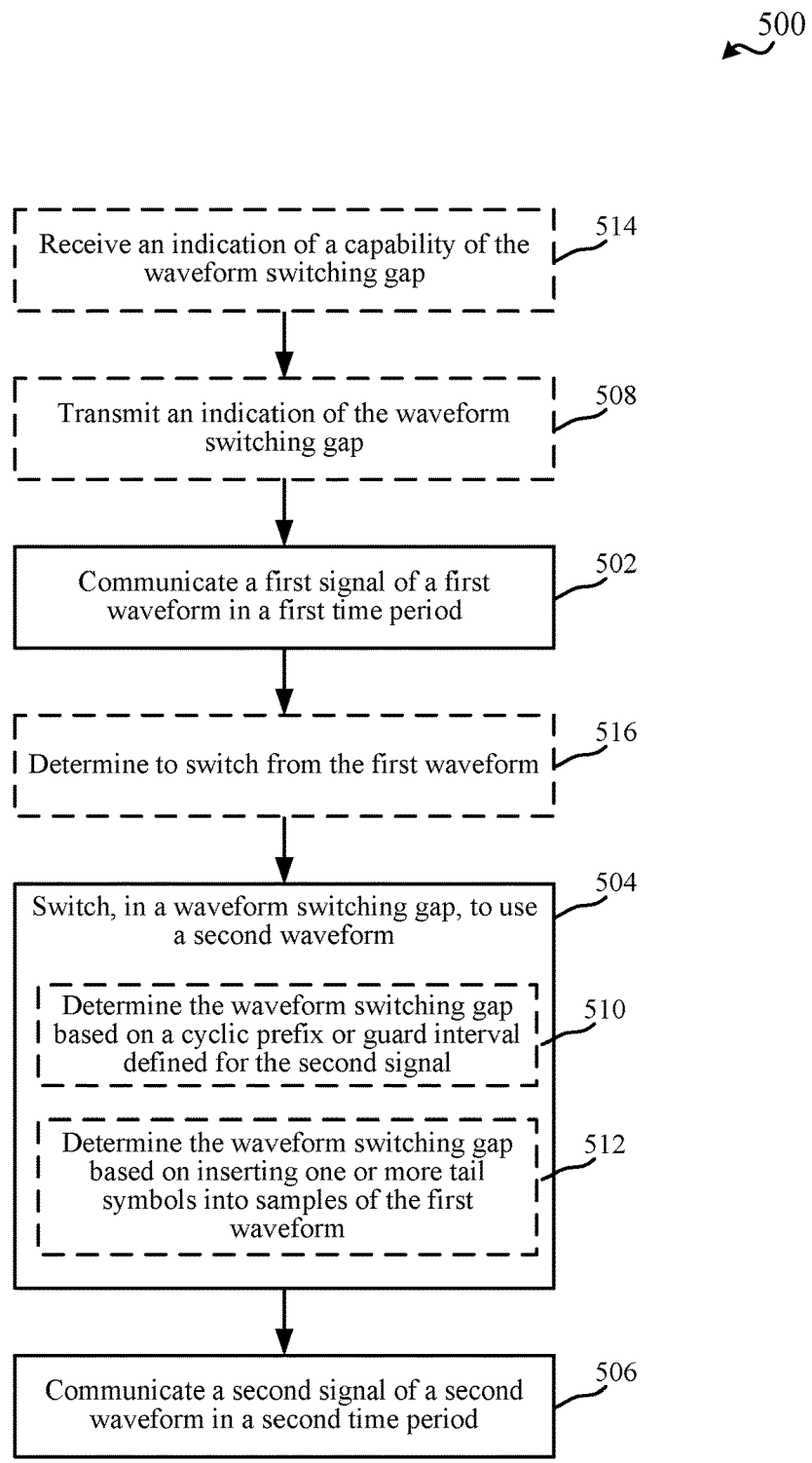
FIG. 5 is a flow chart illustrating an example of a method for switching waveforms and/or configuring a device to switch waveforms, in accordance with aspects described herein.

Turning now to FIGS. 2-8, aspects are depicted with reference to one or more components and one or more methods that may perform the actions or operations described herein, where aspects in dashed line may be optional. Although the operations described below in FIGS. 4 and 5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or UE communicating component 242 for using waveform switching gaps to switch waveforms in communicating with one or more other devices, in accordance with aspects described herein.

In an aspect, the one or more processors 212 can include a modem 240 and/or can be part of the modem 240 that uses one or more modem processors. Thus, the various functions related to UE communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with UE communicating component 242 may be performed by transceiver 202.

Also, memory 216 may be configured to store data used herein and/or local versions of applications 275 or UE communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining UE communicating component 242 and/or one or more of its subcomponents, and/or data associated therewith, when UE 104 is operating at least one processor 212 to execute UE communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 242 can optionally include a gap component 252 for using or determining a waveform switching gap during which to switch waveforms, and/or a waveform switching component 254 for switching among waveforms during a waveform switching gap, in accordance with aspects described herein.

In an aspect, the processor(s) 212 may correspond to one or more of the processors described in connection with the UE in FIG. 8. Similarly, the memory 216 may correspond to the memory described in connection with the UE in FIG. 8.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and BS communicating component 342 for using or configuring waveform switching gaps to switch waveforms in communicating with one or more other devices, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, BS communicating component 342 can optionally include a gap component 352 for using or determining a waveform switching gap during which to switch waveforms, a waveform switching component 354 for switching among waveforms during a waveform switching gap, and/or a configuring component 356 for configuring one or more devices for using a waveform switching gap, in accordance with aspects described herein.

In an aspect, the processor(s) 312 may correspond to one or more of the processors described in connection with the base station in FIG. 8. Similarly, the memory 316 may correspond to the memory described in connection with the base station in FIG. 8.

FIG. 4 illustrates a flow chart of an example of a method 400 for switching waveforms, in accordance with aspects described herein. In an example, a UE 104 can perform the functions described in method 400 using one or more of the components described in FIGS. 1-2.

In method 400, at Block 402, a first signal of a first waveform in a first time period can be communicated. In an aspect, UE communicating component 242, e.g., in conjunction with processor(s) 212, memory 216, transceiver 202, etc., can communicate the first signal of the first waveform in the first time period. In one example, UE communicating component 242 can communicate the first signal by transmitting the first signal of the first waveform to another device (e.g., a base station 102, another UE, etc.). In another example, UE communicating component 242 can communicate the first signal by receiving the first signal of the first waveform from another device (e.g., a base station 102, another UE, etc.). In an example, UE 104 can be configured with resources for communicating the first signal, which can include receiving a resource grant from the base station 102 that indicates the resources for transmitting or receiving the first signal.

For example, the first waveform can include OFDM, DFT-s-OFDM, SC-QAM, etc., as described. In this regard, for example, UE communicating component 242 can generate a waveform for transmission based on performing a transform of data modulated symbols to be transmitted, such as FFT, IFFT, DFT, etc., to map the symbols to time and frequency resources for transmitting. Similarly, in an example, UE communicating component 242 can process a waveform received from another device based on performing a transform (or inverse transform) to recover the data modulated symbols, such as FFT, IFFT, DFT, etc.

In method 400, at Block 404, a second waveform can be switched to for use in a waveform switching gap. In an aspect, waveform switching component 254, e.g., in conjunction with processor(s) 212, memory 216, transceiver 202, UE communicating component 242, etc., can switch, in a waveform switching gap, to use a second waveform. For example, waveform switching component 254 can switch from the first waveform to the second waveform, which can include switching from one of OFDM, DFT-s-OFDM, SC-QAM, to another one of OFDM, DFT-s-OFDM, SC-QAM, etc. In an example, waveform switching component 254 can switch the transceiver 202 to use the second waveform in transmitting or receiving communications, which can include switching components used to process signals before transmission or after reception, switching operations or calculations used to generate signals for transmission or decode received signals, and/or the like. In one example, transceiver 202 can have multiple transmit or receive chains that have different components for generating different waveforms, and waveform switching component 254 can switch the transceiver to use a certain transmit or receive chain to effectuate the switch from using the first waveform to using the second waveform.

In method 400, at Block 406, a second signal of the second waveform can be communicated in a second time period. In an aspect, UE communicating component 242, e.g., in conjunction with processor(s) 212, memory 216, transceiver 202, etc., can communicate the second signal of the second waveform in the second time period. In one example, UE communicating component 242 can communicate the second signal by transmitting the second signal of the second waveform to another device (e.g., a base station 102, another UE, etc.). In another example, UE communicating component 242 can communicate the second signal by receiving the second signal of the second waveform from another device (e.g., a base station 102, another UE, etc.). In an example, UE 104 can be configured with resources for communicating the second signal, which can include receiving a resource grant from the base station 102 that indicates the resources for transmitting or receiving the second signal. In addition, for example, UE communicating component 242 can communicate the second signal with the same one or more devices with which the UE communicating component 242 communicates the first signal. Moreover, as described for example, the second waveform can include OFDM, DFT-s-OFDM, SC-QAM, etc., as described, and can be different than the first waveform.

In switching to use the second waveform at Block 404, gap component 252 can determine the waveform switching gap, which can include determining a start time of the waveform switching gap, a duration of the waveform switching gap, or other parameters of the waveform switching gap. In one example, gap component 252 can determine the waveform switching gap as an explicit gap, which can be configured by another device, implemented in the UE 104 as part of a wireless communication technology standard, etc. In one example of method 400, optionally at Block 408, an indication of the waveform switching gap can be received. In an aspect, gap component 252, e.g., in conjunction with processor(s) 212, memory 216, transceiver 202, UE communicating component 242, etc., can receive the indication of the waveform switching gap. For example, gap component 252 can receive the indication in a configuration from another device (e.g., from base station 102), from memory 216 of the UE 104, and/or the like. For example, the indication may include an indication of a start time for the waveform switching gap, a duration of the waveform switching gap, etc. The waveform switching gap may be defined in a time period between resources for transmitting the first and second signals.

In another example, in switching to use the second waveform at Block 404, optionally at Block 410, the waveform switching gap can be determined based on a CP or GI defined for the second signal. In an aspect, gap component 252, e.g., in conjunction with processor(s) 212, memory 216, transceiver 202, UE communicating component 242, etc., can determine the waveform switching gap based on the CP or GI defined for the second signal. For example, gap component 252 can determine the waveform switching gap to occur in one or more of a period of time used for a GI between the first and second signals, or to occur in a period of time used for a CP of the second signal, such that the waveform switching gap is absorbed in one or more of the GI or CP. This may not have a detrimental impact on the second signal, as the GI occurs between the first and second signal and is intended to be a portion of time where the UE 104 does not transmit, and the CP (or all of the CP) may not be needed to decode the second signal.

In yet another example, in switching to use the second waveform at Block 404, optionally at Block 412, the waveform switching gap can be determined based on inserting one or more tail symbols into samples of the first waveform. In an aspect, gap component 252, e.g., in conjunction with processor(s) 212, memory 216, transceiver 202, UE communicating component 242, etc., can determine the waveform switching gap based on inserting one or more tail symbols into samples of the first waveform. For example, inserting the one or more tail symbols can include inserting a number of zeros (or zeroed symbols) into the samples to cause a low energy portion at the end of the first signal, and the associated period of time can be determined as the waveform switching gap, such that the waveform can be switched without impacting actual communications at the end of the first signal. Examples are shown in FIG. 6.

Figure 6:
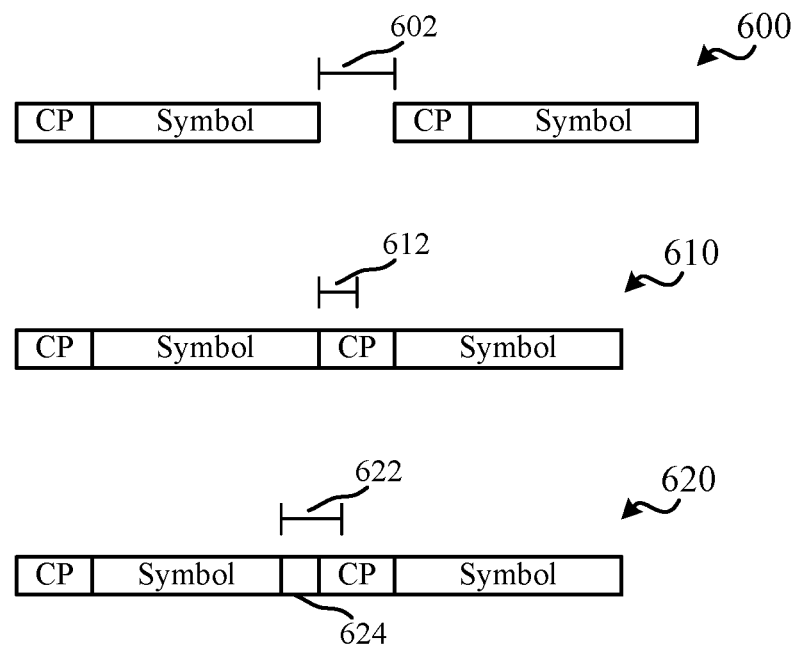
FIG. 6 illustrates examples of waveform switching gap configurations, in accordance with aspects described herein.

FIG. 6 illustrates examples of waveform switching gap configurations 600, 610, 620. In waveform switching gap configuration 600, the waveform switching gap 602 can be configured or determined as an explicit gap between two signals, and a device can switch waveforms during this explicit waveform switching gap 602. In waveform switching gap configuration 610, the waveform switching gap 612 can be configured or determined as being, or including at least a portion of, a CP of a second signal (or a GI between the first and second signals, which may be part of the CP or otherwise), and a device can switch waveforms during this waveform switching gap 612. In waveform switching gap configuration 620, the waveform switching gap 622 can be configured or determined as being, or including at least a portion of, a low energy part of a first signal 624. In an example, waveform switching gap 622 may additionally include at least a portion of a CP of a second signal (or a GI between the first and second signals, which may be part of the CP or otherwise). Moreover, in an example, the low energy part of the first signal 624 can be generated by inserting tail symbols into the samples of the first signal, as described above an further herein. In any case, a device can switch waveforms during this waveform switching gap 622.

Figure 7:
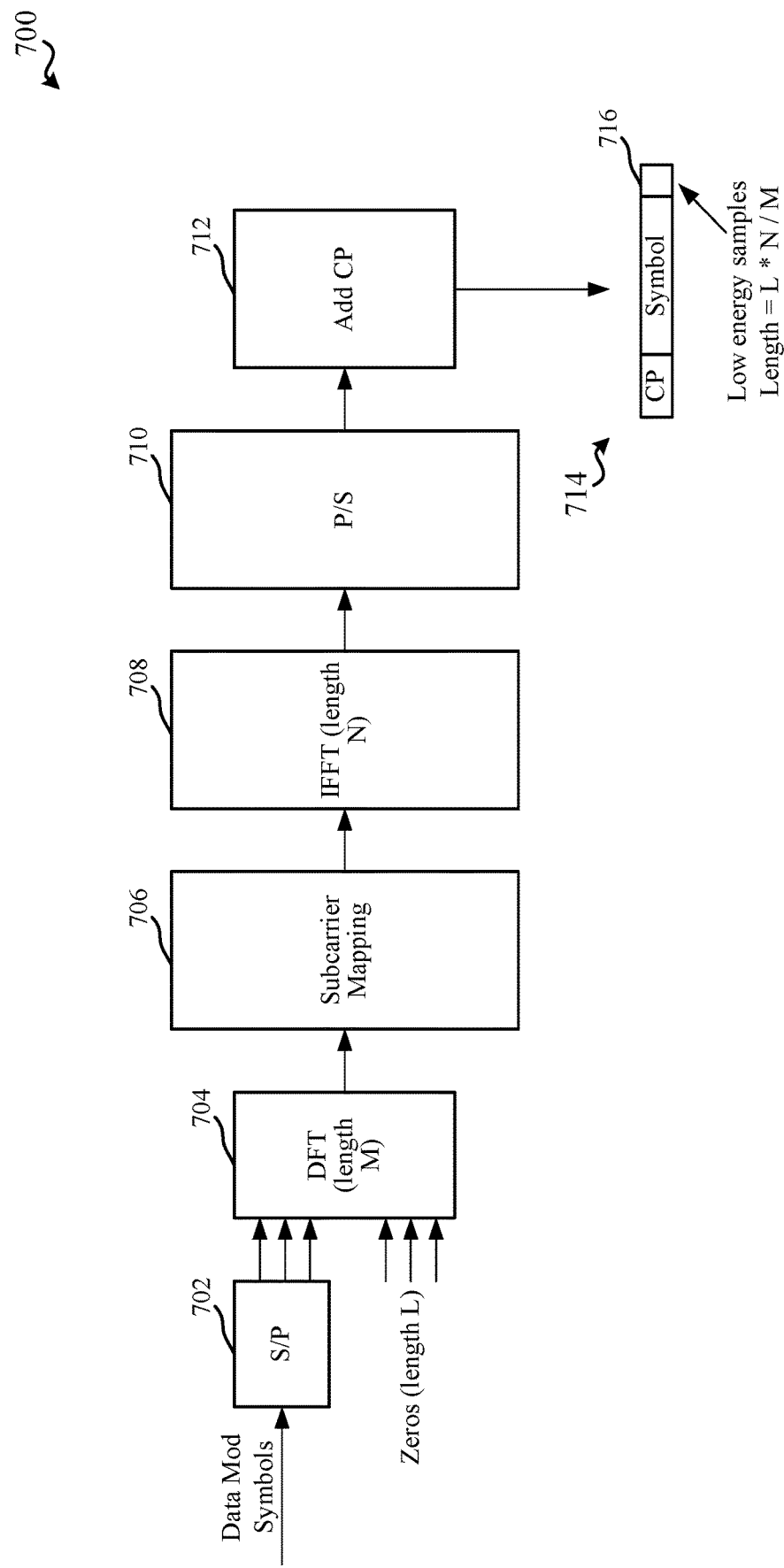
FIG. 7 illustrates an example of a discrete Fourier transform-spread-orthogonal frequency division multiplexing (DFT-s-OFDM) operation, in accordance with aspects described herein.

FIG. 7 illustrates an example of a DFT-s-OFDM operation 700 for inserting tail symbols into a signal to create a low energy part of the signal for a waveform switching gap. In operation 700, data modulated symbols are input into a serial/parallel (S/P) 702 operation. The resulting symbols and appended zero symbols of length L can be input into a DFT 704 operation of length M. A subcarrier mapping 706 operation can be performed on the output of DFT 704, and an IFFT 708 operation of length N can be performed on the output of the subcarrier mapping 706. A parallel/serial (P/S) 710 operation is performed on the output of the IFFT 708 operation, and CP is added at 712. The resulting signal 714 includes a CP portion, a symbol portion, and a low energy portion 716 of length $L=N/M$, which is effectuated by inserting the zeros in the DFT 704 operation. This low energy portion can be used as a waveform switching gap, as described. For example, tail symbols can be added before the DFT 704 operation at the transmitter (e.g., the UE 104, where the UE 104 is communicating the first signal at Block 402 by transmitting the first signal to the base station 102 or another UE). The number of tail symbols to be added can be proportional to the length of the desired waveform switching gap. The waveform switching gap can start at the beginning of the samples corresponding to tail symbols in the time domain signal (shown at low energy portion 716). In addition, for example, the same CP length as other symbols can be added such that the receiver (e.g., base station 102 or another UE receiving the signal from UE 104) can use the have same FFT length to decode the signal.

In one example, the type of waveform switching gap (e.g., or the process used to determine the waveform switching gap) may be different for switching between different waveforms. For example, switching from OFDM to DFT-s-ODFM can use an explicit gap, while switching from DFT-s-OFDM to SC-QAM (or back to OFDM) can use a waveform switching gap in the CP/GI, etc. In one example, the UE 104 can be configured (e.g., by a base station 102 or other device) with an indication of which type of waveform switching gap is to be used with which specific waveform switching scenario.

In an example, using the waveform switching gap can be based on a capability indicated by the UE 104, which can include one or more parameters related to a minimum gap supported by the UE 104. For example in method 400, optionally at Block 414, an indication of a capability of the waveform switching gap can be transmitted. In an aspect, gap component 252, e.g., in conjunction with processor(s) 212, memory 216, transceiver 202, UE communicating component 242, etc., can transmit the indication of the capability of the waveform switching gap. For example, gap component 252 can transmit the indication of the capability to a base station 102 or other device (e.g., another UE), which may transmitted be in radio resource control (RRC) signaling, transmitted as part of a response to a request for capabilities received from the base station 102, etc. In an example, the indication may indicate the minimum gap (e.g., in duration, such as in a number of symbols, milliseconds, etc.) supported by the UE 104 for performing waveform switching.

In an example, gap component 252 can transmit a capability indication of, or related to, a single capability used by the UE 104 for all switching options (e.g., for switching between any waveforms). In another example, gap component 252 can transmit a capability indication of, or related to more than one capability used to account for switching between different waveforms. For example, gap component 252 can indicate a capability for SC-QAM to OFDM/DFT-s-OFDM, a separate capability for OFDM/DFT-s-OFDM to SC-QAM, etc. In addition, for example, gap component 252 can transmit an indication of a capability that is common for both downlink and uplink, or different capabilities for downlink and uplink communications.

In addition, as described, the actual waveform switching gap to use can be indicated to the UE 104 (e.g., by a base station or other device), which may be based on the indicated capability of the UE 104 for a minimum gap. For example, in receiving the indication of the waveform switching gap at Block 408, gap component 252 can receive an indication of the actual gap or one or more parameters for determining the actual gap. For example, gap component 252 can receive the indication from a base station 102 or other device semi-statically, using RRC signaling, dynamically, using downlink control information (DCI), media access control (MAC)-control element (CE), etc. In one example, gap component 252 can receive a semi-statically configured indication from a base station 102, and then can receive a dynamically updated indication from the base station 102 in DCI, MAC-CE, etc. In yet another example, gap component 252 can receive the indication as indicating single or different gaps lengths (for different switching types), as described above. In yet another example, gap component 252 can receive an indication that the actual gap equals the minimum gap reported by the UE. In any case, gap component 252 can determine the waveform switching gap based on one or more of the indications or related parameters.

In another example in method 400, optionally at Block 416, it can be determined to switch from the first waveform. In an aspect, waveform switching component 254, e.g., in conjunction with processor(s) 212, memory 216, transceiver 202, UE communicating component 242, etc., can determine to switch from the first waveform, and can switch from the first waveform to the second waveform at Block 404 based on this determination. For example, waveform switching component 254 can determine to switch the waveform based on a request or instruction from the base station 102, based on a measure of signal quality of signals received from or transmitted to the base station 102, based on a throughput at the UE 104, based on a processing power available at the UE 104, based on a buffer status of the UE 104, etc., such to use a desirable waveform in a given scenario. For example, where channel quality or throughput achieves a threshold, waveform switching component 254 can determine to use a different waveform than where the channel quality or throughput does not achieve the threshold.

FIG. 5 illustrates a flow chart of an example of a method 500 for switching waveforms and/or configuring a device to switch waveforms, in accordance with aspects described herein. In an example, a base station 102 or other device (e.g., a transmitting UE in sidelink communications) can perform the functions described in method 500 using one or more of the components described in FIGS. 1-3.

In method 500, at Block 502, a first signal of a first waveform in a first time period can be communicated. In an aspect, BS communicating component 342, e.g., in conjunction with processor(s) 312, memory 316, transceiver 302, etc., can communicate the first signal of the first waveform in the first time period, similarly as described above with respect to Block 402 of method 400. In one example, BS communicating component 342 can communicate the first signal by transmitting the first signal of the first waveform to another device (e.g., a UE, etc.). In another example, BS communicating component 342 can communicate the first signal by receiving the first signal of the first waveform from another device (e.g., a UE, etc.). In an example, BS 102 can configure the other device with resources for communicating the first signal, as described. Moreover, as described, the first waveform can include OFDM, DFT-s-OFDM, SC-QAM, etc.

In method 500, at Block 504, a second waveform can be switched to for use in a waveform switching gap. In an aspect, waveform switching component 354, e.g., in conjunction with processor(s) 312, memory 316, transceiver 302, BS communicating component 342, etc., can switch, in a waveform switching gap, to use a second waveform, similarly as described above with respect to Block 404 of method 400. For example, waveform switching component 354 can switch from the first waveform to the second waveform, which can include switching from one of OFDM, DFT-s-OFDM, SC-QAM, to another one of OFDM, DFT-s-OFDM, SC-QAM, etc. In an example, waveform switching component 354 can switch the transceiver 302 to use the second waveform in transmitting or receiving communications.

In method 500, at Block 506, a second signal of the second waveform can be communicated in a second time period. In an aspect, BS communicating component 342, e.g., in conjunction with processor(s) 312, memory 316, transceiver 302, etc., can communicate the second signal of the second waveform in the second time period, similarly as described above with respect to Block 406 of method 400. In one example, BS communicating component 342 can communicate the second signal by transmitting the second signal of the second waveform to another device (e.g., a UE, etc.). In another example, BS communicating component 342 can communicate the second signal by receiving the second signal of the second waveform from another device (e.g., a UE, etc.). In an example, BS 102 can configure the other device with resources for communicating the second signal. Moreover, as described for example, the second waveform can include OFDM, DFT-s-OFDM, SC-QAM, etc., as described, and can be different than the first waveform.

In switching to use the second waveform at Block 504, gap component 352 can determine the waveform switching gap, which can include determining a start time of the waveform switching gap, a duration of the waveform switching gap, or other parameters of the waveform switching gap, similarly as described with respect to Block 404 of method 400. In one example, gap component 352 can determine the waveform switching gap as an explicit gap, which can be configured by the base station 102 (e.g., to the UE 104), implemented in the base station 102 (and the UE 104) as part of a wireless communication technology standard, etc. In one example of method 500, optionally at Block 508, an indication of the waveform switching gap can be transmitted. In an aspect, configuring component 356, e.g., in conjunction with processor(s) 312, memory 316, transceiver 302, BS communicating component 342, etc., can transmit the indication of the waveform switching gap. For example, the indication may include an indication of a start time for the waveform switching gap, a duration of the waveform switching gap, etc., as described.

In an example, configuring component 356 can determine the waveform switching gap to be different for different waveform switching scenarios, and can configure devices with parameters for determining the waveform switching gap in different waveform switching scenarios. In another example, configuring component 356 can determine waveform switching gaps to be of different sizes or to be determined differently for different devices, which can be based on certain device parameters, such as UE class, subscription level, throughput of the UE, channel quality or other measurements reported by the UE, etc. For example, certain classes of UE may be capable of only explicit gap configuration, whereas other UE classes can be capable of using the CP/GI as the waveform switching gap.

In another example, in switching to use the second waveform at Block 504, optionally at Block 510, the waveform switching gap can be determined based on a CP or GI defined for the second signal. In an aspect, gap component 352, e.g., in conjunction with processor(s) 312, memory 316, transceiver 302, BS communicating component 342, etc., can determine the waveform switching gap based on the CP or GI defined for the second signal, similarly as described with respect to Block 510 of method 500. For example, gap component 352 can determine the waveform switching gap to occur in one or more of a period of time used for a GI between the first and second signals, or to occur in a period of time used for a CP of the second signal, such that the waveform switching gap is absorbed in one or more of the GI or CP.

In yet another example, in switching to use the second waveform at Block 504, optionally at Block 512, the waveform switching gap can be determined based on inserting one or more tail symbols into samples of the first waveform. In an aspect, gap component 352, e.g., in conjunction with processor(s) 312, memory 316, transceiver 302, BS communicating component 342, etc., can determine the waveform switching gap based on inserting one or more tail symbols into samples of the first waveform, similarly as described with respect to Block 412 of method 400. For example, inserting the one or more tail symbols can include inserting a number of zeros (or zeroed symbols) into the samples to cause a low energy portion at the end of the first signal, as shown in, and described with respect to, FIG. 7 above.

In an example, using the waveform switching gap can be based on a capability indicated by a UE, which can include one or more parameters related to a minimum gap supported by the UE. For example in method 500, optionally at Block 514, an indication of a capability of the waveform switching gap can be received. In an aspect, gap component 352, e.g., in conjunction with processor(s) 312, memory 316, transceiver 302, BS communicating component 342, etc., can receive the indication of the capability of the waveform switching gap. For example, gap component 352 can receive the indication of the capability from the UE, which may be received be in RRC signaling, received as part of a response to a request for capabilities received from the base station 102, etc. In an example, the indication may indicate the minimum gap (e.g., in duration, such as in a number of symbols, milliseconds, etc.) supported by the UE 104 for performing waveform switching.

As described, in an example, gap component 352 can receive a capability indication of, or related to, a single capability used by the UE 104 for all switching options (e.g., for switching between any waveforms). In another example, gap component 352 can receive a capability indication of, or related to more than one capability used to account for switching between different waveforms. In addition, for example, gap component 352 can receive an indication of a capability that is common for both downlink and uplink, or different capabilities for downlink and uplink communications.

In addition, as described, the actual waveform switching gap to use can be indicated by the base station 102 (e.g., to the UE 104), which may be based on the indicated capability of the UE 104 for a minimum gap. For example, in transmitting the indication of the waveform switching gap at Block 508, configuring component 356 can transmit an indication of the actual gap or one or more parameters for determining the actual gap. As described, for example, configuring component 356 can determine the actual gap as specific for the UE 104, specific for the waveform switching scenario, etc. In one example, configuring component 356 can transmit the indication semi-statically, using RRC signaling, dynamically, using downlink control information (DCI), media access control (MAC)-control element (CE), etc. In an example, configuring component 356 can transmit parameters for determining the actual gap (e.g., based on the reported minimum gap), an indication that the actual gap equals the minimum gap reported by the UE, etc.

In another example in method 500, optionally at Block 516, it can be determined to switch from the first waveform. In an aspect, waveform switching component 354, e.g., in conjunction with processor(s) 312, memory 316, transceiver 302, BS communicating component 342, etc., can determine to switch from the first waveform, and can switch from the first waveform to the second waveform at Block 404 based on this determination. For example, waveform switching component 354 can determine to switch the waveform based on a request or instruction from the UE, based on a measure of signal quality received from the UE, based on a throughput of the UE, based on a processing power available at the UE, based on a buffer status reported by the UE, etc., such to use a desirable waveform in a given scenario. For example, where channel quality or throughput achieves a threshold, waveform switching component 354 can determine to use a different waveform than where the channel quality or throughput does not achieve the threshold. In addition, in an example where waveform switching component 354 determines to switch the waveform, configuring component 356 can indicate to the UE 104 to also switch the waveform.

Figure 8:
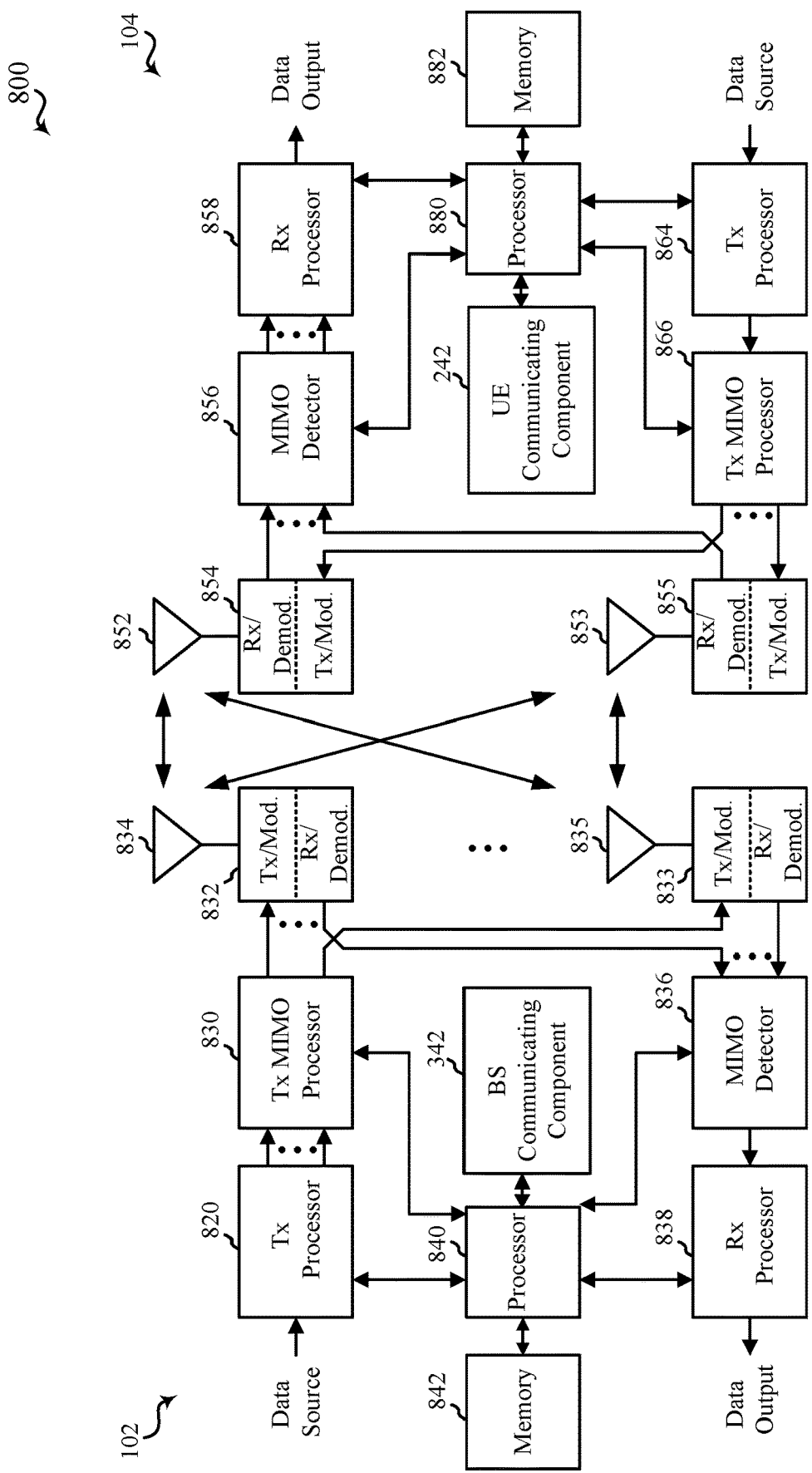
FIG. 8 is a block diagram illustrating an example of a MIMO communication system including a base station and a UE, in accordance with various aspects of the present disclosure.

FIG. 8 is a block diagram of a MIMO communication system 800 including a base station 102 and a UE 104. The MIMO communication system 800 may illustrate aspects of the wireless communication access network 100 described with reference to FIG. 1. The base station 102 may be an example of aspects of the base station 102 described with reference to FIG. 1. The base station 102 may be equipped with antennas 834 and 835, and the UE 104 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UEs 104 may be an example of aspects of the UEs 104 described with reference to FIGS. 1-2. At the UE 104, the UE antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104 to a data output, and provide decoded control information to a processor 880, or memory 882.

The processor 880 may in some cases execute stored instructions to instantiate a UE communicating component 242 (see e.g., FIGS. 1 and 2).

On the uplink (UL), at the UE 104, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the base station 102 in accordance with the communication parameters received from the base station 102. At the base station 102, the UL signals from the UE 104 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The processor 840 may in some cases execute stored instructions to instantiate a BS communicating component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 800. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 800.

The following aspects are illustrative only and aspects thereof may be combined with aspects of other embodiments or teaching described herein, without limitation.

Aspect 1 is an apparatus for wireless communication including a transceiver, a memory configured to store instructions, and one or more processors communicatively coupled with the memory and the transceiver. The one or more processors are configured to communicate, using the transceiver, a first signal of a first waveform in a first time period, switch, in a waveform switching gap, the transceiver to use a second waveform, and communicate, using the transceiver, a second signal of a second waveform in a second time period, where the waveform switching gap occurs between the first time period and the second time period.

In Aspect 2, the apparatus of Aspect 1 includes where the waveform switching gap is an explicitly configured gap.

In Aspect 3, the apparatus of Aspect 2 includes where the one or more processors are further configured to receive, from a base station, an indication of the explicitly configured gap.

In Aspect 4, the apparatus of Aspect 2 includes where the one or more processors are further configured to transmit, to a UE, an indication of the explicitly configured gap.

In Aspect 5, the apparatus of any of Aspects 1 to 4 includes where the waveform switching gap is at least a portion of a cyclic prefix associated with the second waveform or a guard interval defined by a wireless communication technology to occur between a first communication of the first waveform and a second communication of the second waveform.

In Aspect 6, the apparatus of any of Aspects 1 to 5 includes where the one or more processors are further configured to create the waveform switching gap at least in part by creating tail symbols into samples corresponding to the first waveform.

In Aspect 7, the apparatus of any of Aspects 1 to 6 includes where the waveform switching gap is based on an indicated UE capability for a minimum gap.

In Aspect 8, the apparatus of Aspect 7 includes where the UE capability indicates the minimum gap for all waveforms.

In Aspect 9, the apparatus of Aspect 7 includes where the UE capability indicates the minimum gap as different gaps for switching between each of multiple waveforms.

In Aspect 10, the apparatus of any of Aspects 7 to 9 includes where the UE capability indicates the minimum gap as a same gap or different gaps for uplink and downlink communications.

In Aspect 11, the apparatus of any of Aspects 7 to 10 includes where the one or more processors are further configured to transmit, to a base station, the UE capability.

In Aspect 12, the apparatus of any of Aspects 7 to 10 includes where the one or more processors are further configured to receive, from the UE, the UE capability.

In Aspect 13, the apparatus of any of Aspects 1 to 12 includes where the waveform switching gap is based on a configured actual gap.

In Aspect 14, the apparatus of Aspect 13 includes where the configured actual gap is based on a minimum gap indicated in a UE capability.

In Aspect 15, the apparatus of any of Aspects 13 or 14 includes where the one or more processors are further configured to receive, from a base station, a configuration indicating the configured actual gap in at least one of DCI, a MAC-CE, or RRC signaling.

In Aspect 16, the apparatus of Aspect 15 includes where the one or more processors are further configured to receive, from a base station, a second configuration indicating a second configured actual gap for a second switching between waveforms, where the configured actual gap is of a different duration than the second configured actual gap.

In Aspect 17, the apparatus of any of Aspects 13 or 14 includes where the one or more processors are further configured to transmit, to a UE, a configuration indicating the configured actual gap in at least one of DCI, a MAC-CE, or RRC signaling.

In Aspect 18, the apparatus of Aspect 17 includes where the one or more processors are further configured to transmit, to the UE, a second configuration indicating a second configured actual gap for a second switching between waveforms, where the configured actual gap is of a different duration than the second configured actual gap.

In Aspect 19, the apparatus of any of Aspects 1 to 18 includes where the first waveform is one of an OFDM waveform, a DFT-s-OFDM waveform, or a SC-QAM waveform, and where the second waveform is a different one of the ODFM waveform, the DFT-s-OFDM waveform, or the SC-QAM waveform.

In Aspect 20, the apparatus of any of Aspects 1 to 19 includes where the one or more processors are configured to switch the transceiver to use the second waveform based at least in part on receiving, from a base station, an indication to switch the transceiver to use the second waveform.

In Aspect 21, the apparatus of any of Aspects 1 to 19 includes where the one or more processors are further configured to transmit, to a UE, an indication to switch a UE transceiver at the UE to use the second waveform.

Aspect 22 is a method for wireless communication including communicating, using a transceiver, a first signal of a first waveform in a first time period, switching, in a waveform switching gap, the transceiver to use a second waveform, and communicating, using the transceiver, a second signal of a second waveform in a second time period, where the waveform switching gap occurs between the first time period and the second time period.

In Aspect 23, the method of Aspect 22 includes where the waveform switching gap is an explicitly configured gap.

In Aspect 24, the method of Aspect 23 includes receiving, from a base station, an indication of the explicitly configured gap.

In Aspect 25, the method of Aspect 23 includes transmitting, to a UE, an indication of the explicitly configured gap.

In Aspect 26, the method of any of Aspects 22 to 25 includes where the waveform switching gap is at least a portion of a cyclic prefix associated with the second waveform or a guard interval defined by a wireless communication technology to occur between a first communication of the first waveform and a second communication of the second waveform.

In Aspect 27, the method of any of Aspects 22 to 26 includes creating the waveform switching gap at least in part by creating tail symbols into samples corresponding to the first waveform.

In Aspect 28, the method of any of Aspects 22 to 27 includes where the waveform switching gap is based on an indicated UE capability for a minimum gap.

In Aspect 29, the method of Aspect 28 includes where the UE capability indicates the minimum gap for all waveforms.

In Aspect 30, the method of Aspect 28 includes where the UE capability indicates the minimum gap as different gaps for switching between each of multiple waveforms.

In Aspect 31, the method of any of Aspects 28 to 30 includes where the UE capability indicates the minimum gap as a same gap or different gaps for uplink and downlink communications.

In Aspect 32, the method of any of Aspects 28 to 31 includes transmitting, to a base station, the UE capability.

In Aspect 33, the method of any of Aspects 28 to 31 includes receiving, from the UE, the UE capability.

In Aspect 34, the method of any of Aspects 22 to 33 includes where the waveform switching gap is based on a configured actual gap.

In Aspect 35, the method of Aspect 34 includes where the configured actual gap is based on a minimum gap indicated in a UE capability.

In Aspect 36, the method of any of Aspects 34 or 35 includes receiving, from a base station, a configuration indicating the configured actual gap in at least one of DCI, a MAC-CE, or RRC signaling.

In Aspect 37, the method of Aspect 36 includes receiving, from a base station, a second configuration indicating a second configured actual gap for a second switching between waveforms, where the configured actual gap is of a different duration than the second configured actual gap.

In Aspect 38, the method of any of Aspects 34 or 35 includes transmitting, to a UE, a configuration indicating the configured actual gap in at least one of DCI, a MAC-CE, or RRC signaling.

In Aspect 39, the method of Aspect 38 includes transmitting, to the UE, a second configuration indicating a second configured actual gap for a second switching between waveforms, where the configured actual gap is of a different duration than the second configured actual gap.

In Aspect 40, the method of any of Aspects 22 to 39 includes where the first waveform is one of an OFDM waveform, a DFT-s-OFDM waveform, or a SC-QAM waveform, and where the second waveform is a different one of the ODFM waveform, the DFT-s-OFDM waveform, or the SC-QAM waveform.

In Aspect 41, the method of any of Aspects 22 to 40 includes where switching the transceiver to use the second waveform is based at least in part on receiving, from a base station, an indication to switch the transceiver to use the second waveform.

In Aspect 42, the method of any of Aspects 22 to 40 includes transmitting, to a UE, an indication to switch a UE transceiver at the UE to use the second waveform.

Aspect 43 is an apparatus for wireless communication including means for communicating, using a transceiver, a first signal of a first waveform in a first time period, means for switching, in a waveform switching gap, the transceiver to use a second waveform, and means for communicating, using the transceiver, a second signal of a second waveform in a second time period, where the waveform switching gap occurs between the first time period and the second time period.

In Aspect 44, the apparatus of Aspect 43 includes where the waveform switching gap is an explicitly configured gap.

In Aspect 45, the apparatus of Aspect 44 includes means for receiving, from a base station, an indication of the explicitly configured gap.

In Aspect 46, the apparatus of Aspect 44 includes means for transmitting, to a UE, an indication of the explicitly configured gap.

In Aspect 47, the apparatus of any of Aspects 43 to 46 includes where the waveform switching gap is at least a portion of a cyclic prefix associated with the second waveform or a guard interval defined by a wireless communication technology to occur between a first communication of the first waveform and a second communication of the second waveform.

In Aspect 48, the apparatus of any of Aspects 43 to 47 includes means for creating the waveform switching gap at least in part by creating tail symbols into samples corresponding to the first waveform.

In Aspect 49, the apparatus of any of Aspects 43 to 48 includes where the waveform switching gap is based on an indicated UE capability for a minimum gap.

In Aspect 50, the apparatus of Aspect 49 includes where the UE capability indicates the minimum gap for all waveforms.

In Aspect 51, the apparatus of Aspect 49 includes where the UE capability indicates the minimum gap as different gaps for switching between each of multiple waveforms.

In Aspect 52, the apparatus of any of Aspects 49 to 51 includes where the UE capability indicates the minimum gap as a same gap or different gaps for uplink and downlink communications.

In Aspect 53, the apparatus of any of Aspects 49 to 52 includes means for transmitting, to a base station, the UE capability.

In Aspect 54, the apparatus of any of Aspects 49 to 52 includes means for receiving, from the UE, the UE capability.

In Aspect 55, the apparatus of any of Aspects 43 to 54 includes where the waveform switching gap is based on a configured actual gap.

In Aspect 56, the apparatus of Aspect 55 includes where the configured actual gap is based on a minimum gap indicated in a UE capability.

In Aspect 57, the apparatus of any of Aspects 55 or 56 includes means for receiving, from a base station, a configuration indicating the configured actual gap in at least one of DCI, a MAC-CE, or RRC signaling.

In Aspect 58, the apparatus of Aspect 57 includes means for receiving, from a base station, a second configuration indicating a second configured actual gap for a second switching between waveforms, where the configured actual gap is of a different duration than the second configured actual gap.

In Aspect 59, the apparatus of any of Aspects 55 or 56 includes means for transmitting, to a UE, a configuration indicating the configured actual gap in at least one of DCI, a MAC-CE, or RRC signaling.

In Aspect 60, the apparatus of Aspect 59 includes means for transmitting, to the UE, a second configuration indicating a second configured actual gap for a second switching between waveforms, where the configured actual gap is of a different duration than the second configured actual gap.

In Aspect 61, the apparatus of any of Aspects 43 to 60 includes where the first waveform is one of an OFDM waveform, a DFT-s-OFDM waveform, or a SC-QAM waveform, and where the second waveform is a different one of the ODFM waveform, the DFT-s-OFDM waveform, or the SC-QAM waveform.

In Aspect 62, the apparatus of any of Aspects 43 to 61 includes where the means for switching switches the transceiver to use the second waveform based at least in part on receiving, from a base station, an indication to switch the transceiver to use the second waveform.

In Aspect 63, the apparatus of any of Aspects 43 to 61 includes means for transmitting, to a UE, an indication to switch a UE transceiver at the UE to use the second waveform.

Aspect 64 is a computer-readable medium including code executable by one or more processors for wireless communication, the code including code for communicating, using a transceiver, a first signal of a first waveform in a first time period, switching, in a waveform switching gap, the transceiver to use a second waveform, and communicating, using the transceiver, a second signal of a second waveform in a second time period, where the waveform switching gap occurs between the first time period and the second time period.

In Aspect 65, the computer-readable medium of Aspect 64 includes where the waveform switching gap is an explicitly configured gap.

In Aspect 66, the computer-readable medium of Aspect 65 includes code for receiving, from a base station, an indication of the explicitly configured gap.

In Aspect 67, the computer-readable medium of Aspect 65 includes code for transmitting, to a UE, an indication of the explicitly configured gap.

In Aspect 68, the computer-readable medium of any of Aspects 64 to 67 includes where the waveform switching gap is at least a portion of a cyclic prefix associated with the second waveform or a guard interval defined by a wireless communication technology to occur between a first communication of the first waveform and a second communication of the second waveform.

In Aspect 69, the computer-readable medium of any of Aspects 64 to 68 includes code for creating the waveform switching gap at least in part by creating tail symbols into samples corresponding to the first waveform.

In Aspect 70, the computer-readable medium of any of Aspects 64 to 69 includes where the waveform switching gap is based on an indicated UE capability for a minimum gap.

In Aspect 71, the computer-readable medium of Aspect 70 includes where the UE capability indicates the minimum gap for all waveforms.

In Aspect 72, the computer-readable medium of Aspect 70 includes where the UE capability indicates the minimum gap as different gaps for switching between each of multiple waveforms.

In Aspect 73, the computer-readable medium of any of Aspects 70 to 72 includes where the UE capability indicates the minimum gap as a same gap or different gaps for uplink and downlink communications.

In Aspect 74, the computer-readable medium of any of Aspects 70 to 73 includes code for transmitting, to a base station, the UE capability.

In Aspect 75, the computer-readable medium of any of Aspects 70 to 73 includes code for receiving, from the UE, the UE capability.

In Aspect 76, the computer-readable medium of any of Aspects 64 to 75 includes where the waveform switching gap is based on a configured actual gap.

In Aspect 77, the computer-readable medium of Aspect 76 includes where the configured actual gap is based on a minimum gap indicated in a UE capability.

In Aspect 78, the computer-readable medium of any of Aspects 76 or 77 includes code for receiving, from a base station, a configuration indicating the configured actual gap in at least one of DCI, a MAC-CE, or RRC signaling.

In Aspect 79, the computer-readable medium of Aspect 78 includes code for receiving, from a base station, a second configuration indicating a second configured actual gap for a second switching between waveforms, where the configured actual gap is of a different duration than the second configured actual gap.

In Aspect 80, the computer-readable medium of any of Aspects 76 or 77 includes code for transmitting, to a UE, a configuration indicating the configured actual gap in at least one of DCI, a MAC-CE, or RRC signaling.

In Aspect 81, the computer-readable medium of Aspect 80 includes code for transmitting, to the UE, a second configuration indicating a second configured actual gap for a second switching between waveforms, where the configured actual gap is of a different duration than the second configured actual gap.

In Aspect 82, the computer-readable medium of any of Aspects 64 to 81 includes where the first waveform is one of an OFDM waveform, a DFT-s-OFDM waveform, or a SC-QAM waveform, and where the second waveform is a different one of the ODFM waveform, the DFT-s-OFDM waveform, or the SC-QAM waveform.

In Aspect 83, the computer-readable medium of any of Aspects 64 to 82 includes where the code for switching switches the transceiver to use the second waveform based at least in part on receiving, from a base station, an indication to switch the transceiver to use the second waveform.

In Aspect 84, the computer-readable medium of any of Aspects 64 to 82 includes code for transmitting, to a UE, an indication to switch a UE transceiver at the UE to use the second waveform.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
a memory configured to store instructions; and
one or more processors communicatively coupled with the memory and the transceiver, wherein the one or more processors are configured to:
communicate, using the transceiver, a first signal of a first waveform in a first time period;
switch, in a waveform switching gap, the transceiver to use a second waveform; and
communicate, using the transceiver, a second signal of the second waveform in a second time period, wherein the waveform switching gap occurs between the first time period and the second time period.

2. The apparatus of claim 1, wherein the waveform switching gap is an explicitly configured gap.

3. The apparatus of claim 2, wherein the one or more processors are further configured to receive, from a base station, an indication of the explicitly configured gap.

4. The apparatus of claim 2, wherein the one or more processors are further configured to transmit, to a user equipment (UE), an indication of the explicitly configured gap.

5. The apparatus of claim 1, wherein the waveform switching gap is at least a portion of a cyclic prefix associated with the second waveform or a guard interval defined by a wireless communication technology to occur between a first communication of the first waveform and a second communication of the second waveform.

6. The apparatus of claim 1, wherein the one or more processors are further configured to create the waveform switching gap at least in part by creating tail symbols into samples corresponding to the first waveform.

7. The apparatus of claim 1, wherein the waveform switching gap is based on an indicated user equipment (UE) capability for a minimum gap.

8. The apparatus of claim 7, wherein the UE capability indicates the minimum gap for all waveforms.

9. The apparatus of claim 7, wherein the UE capability indicates the minimum gap as different gaps for switching between each of multiple waveforms.

10. The apparatus of claim 7, wherein the UE capability indicates the minimum gap as a same gap or different gaps for uplink and downlink communications.

11. The apparatus of claim 7, wherein the one or more processors are further configured to transmit, to a base station, the UE capability.

12. The apparatus of claim 7, wherein the one or more processors are further configured to receive, from the UE, the UE capability.

13. The apparatus of claim 1, wherein the waveform switching gap is based on a configured actual gap.

14. The apparatus of claim 13, wherein the configured actual gap is based on a minimum gap indicated in a UE capability.

15. The apparatus of claim 13, wherein the one or more processors are further configured to receive, from a base station, a configuration indicating the configured actual gap in at least one of downlink control information (DCI), a media access control (MAC)-control element (CE), or radio resource control (RRC) signaling.

16. The apparatus of claim 15, wherein the one or more processors are further configured to receive, from a base station, a second configuration indicating a second configured actual gap for a second switching between waveforms, wherein the configured actual gap is of a different duration than the second configured actual gap.

17. The apparatus of claim 13, wherein the one or more processors are further configured to transmit, to a user equipment (UE), a configuration indicating the configured actual gap in at least one of downlink control information (DCI), a media access control (MAC)-control element (CE), or radio resource control (RRC) signaling.

18. The apparatus of claim 17, wherein the one or more processors are further configured to transmit, to the UE, a second configuration indicating a second configured actual gap for a second switching between waveforms, wherein the configured actual gap is of a different duration than the second configured actual gap.

19. The apparatus of claim 1, wherein the first waveform is one of an orthogonal frequency division multiplexing (OFDM) waveform, a discrete Fourier transform-spread-OFDM (DFT-s-OFDM) waveform, or a single carrier-quadrature amplitude modulation (SC-QAM) waveform, and wherein the second waveform is a different one of the ODFM waveform, the DFT-s-OFDM waveform, or the SC-QAM waveform.

20. The apparatus of claim 1, wherein the one or more processors are configured to switch the transceiver to use the second waveform based at least in part on receiving, from a base station, an indication to switch the transceiver to use the second waveform.

21. The apparatus of claim 1, wherein the one or more processors are further configured to transmit, to a user equipment (UE), an indication to switch a UE transceiver at the UE to use the second waveform.

22. A method for wireless communication, comprising:
communicating, using a transceiver, a first signal of a first waveform in a first time period;
switching, in a waveform switching gap, the transceiver to use a second waveform; and
communicating, using the transceiver, a second signal of the second waveform in a second time period, wherein the waveform switching gap occurs between the first time period and the second time period.

23. The method of claim 22, wherein the waveform switching gap is an explicitly configured gap.

24. The method of claim 23, further comprising receiving, from a base station, an indication of the explicitly configured gap.

25. The method of claim 23, further comprising transmitting, to a user equipment (UE), an indication of the explicitly configured gap.

26. The method of claim 22, wherein the waveform switching gap is at least a portion of a cyclic prefix associated with the second waveform or a guard interval defined by a wireless communication technology to occur between a first communication of the first waveform and a second communication of the second waveform.

27. The method of claim 22, further comprising creating the waveform switching gap at least in part by creating tail symbols into samples corresponding to the first waveform.

28. An apparatus for wireless communication, comprising:
means for communicating, using a transceiver, a first signal of a first waveform in a first time period;
means for switching, in a waveform switching gap, the transceiver to use a second waveform; and
means for communicating, using the transceiver, a second signal of the second waveform in a second time period, wherein the waveform switching gap occurs between the first time period and the second time period.

29. The apparatus of claim 28, wherein the waveform switching gap is an explicitly configured gap.

30. A non-transitory computer-readable medium, comprising code executable by one or more processors for wireless communication, the code comprising code for:
communicating, using a transceiver, a first signal of a first waveform in a first time period;
switching, in a waveform switching gap, the transceiver to use a second waveform; and
communicating, using the transceiver, a second signal of the second waveform in a second time period, wherein the waveform switching gap occurs between the first time period and the second time period.

* * * * *